United States Patent [19]
Brown, Jr. et al.

[11] Patent Number: 5,617,005
[45] Date of Patent: Apr. 1, 1997

[54] METHOD AND APPARATUS FOR CHARGING LEAD ACID BATTERIES

[76] Inventors: Fon R. Brown, Jr., 1557 E. Grandview, Mesa, Ariz. 85203; Robert C. Nelson, 1360 E. Brown Rd. #35, Mesa, Ariz. 85203-9931

[21] Appl. No.: 285,831

[22] Filed: Aug. 4, 1994

[51] Int. Cl.$^6$ ............................................. H01M 10/44
[52] U.S. Cl. .................................. 320/21; 320/31; 320/39
[58] Field of Search ................................. 320/4, 14, 21, 320/23, 30, 39, 40, 48, 31

[56] References Cited

U.S. PATENT DOCUMENTS

| | | | |
|---|---|---|---|
| 3,597,673 | 8/1971 | Burkett et al. | 320/5 |
| 4,385,269 | 5/1983 | Aspinwall et al. | 320/14 |
| 4,829,225 | 5/1989 | Podrazhansky et al. | 320/14 |
| 5,307,000 | 4/1994 | Podrazhansky et al. | 320/14 |
| 5,475,294 | 12/1995 | Isoda | 320/14 |

*Primary Examiner*—Edward H. Tso
*Attorney, Agent, or Firm*—H. Gordon Shields

[57] ABSTRACT

Battery charger apparatus and method includes a clock to provide timing information and logic to control the charging time of a battery being charged. The logic also controls a discharge time period in which the battery being charged is discharged for a relatively short period of time. After the discharge time, the voltage across the battery terminals is sensed by the logic to determine the state of the charge of the battery. The pulsing of the battery, in which the charging times and discharging times are alternated, and then the sensing of the battery voltage, is controlled by the logic to provide the charging of a battery in the shortest possible time period.

15 Claims, 1 Drawing Sheet

METHOD AND APPARATUS FOR CHARGING LEAD ACID BATTERIES

BACKGROUND OF THE INVENTION

1. Field of the Invention

This invention relates to battery chargers and, more particularly, to apparatus for charging a battery and for a end to a method of charging a rechargeable lead acid battery.

2. Description of the Prior Art

Battery charger apparatus of the prior art typically includes a transformer for decreasing line voltage to a desired level and a rectifier for changing alternating current to direct current. The direct current is applied across the battery to recharge the battery. There have been variations of the relatively simple battery charging apparatus described in the previous sentence, but typically the primary differences between various types of battery chargers is simply in the amount of current applied to the battery being charged.

An inherent problem with applying a relatively high charging current is in the amount of heat generated. The heat generated has a deleterious effect on the battery being charged.

Pulse charging was used at least as early as the 1950s for charging NiCd (nickel cadmium) aircraft batteries, but was not adapted to lead acid batteries.

There are basically two ways of charging a battery, one way is to utilized a relatively low charging current for a relatively long period of time, and the second way is to utilized a relatively high charging current for a relatively short period of time. In the latter case, the heat buildup is a prime consideration. On the other hand, if charging time is unimportant, then the utilization of a relatively low charging current is preferable because the heat problem is obviated.

The apparatus of the present invention overcomes the heat problem and also overcomes the time problem by providing a charging circuit in which a charging current is supplied for a period of time, then a discharge resistance is placed across the battery for a short period of time, followed by a sampling of the current in the battery. Logic is utilized to control the charging time, the discharging time, and the sampling or sensing of the battery being charged. The charging current is varied in accordance with predetermined parameters so as to maximize the charging current, and accordingly minimize the charging time, while at the same time substantially eliminating the problem of heat buildup.

U.S Pat. No. 3,597,673 (Burkett et al) discloses a battery charger apparatus which utilizes pulse charging. Discharge pulses are disposed between charge pulses. After a predetermined battery terminal voltage is achieved during charging, the charging current is reduced to a trickle. Specific circuitry is disclosed.

U.S. Pat. No. 4,829,225 (Podrazhansky & Popp) discloses another battery charging apparatus. Different embodiments are disclosed. Pulse charging is again involved. After a charging pulse, a depolarization pulse is used to discharge the battery across a load. The battery condition is sampled during the depolarization pulse. The depolarization pulse time is followed by a stabilization period, and then the sequence is repeated until the battery is charged to the desired level. The depolarization pulse is not specifically explained. Examples of using the apparatus of the '225 patent with different types of batteries is disclosed. For example, an example is given for charging a 9 volt alkaline battery, nickel-cadmium batteries, and a 12 volt automobile battery.

SUMMARY OF THE INVENTION

The invention described and claimed herein comprises a method for charging a rechargeable lead acid battery and apparatus for carrying out the method of recharging of the battery. A transformer is used to decrease line voltage to a desired charging voltage, and a full wave switching rectifier with zero crossing detection is used to rectify the alternating current to direct current. The charging apparatus includes a clock unit for determining times for charging, for discharging, and the charge and discharge times are controlled by appropriate logic. The condition of the battery being charged is appropriately sensed after a discharge cycle, and the information sensed from the battery being charged is used by the logic to determine when the battery is fully charged.

Among the objects of the present invention are the following:

To provide new and useful battery charging apparatus;

To provide new and useful apparatus for charging a battery having alternating charging and discharging cycles;

To provide a new and useful method for charging a rechargeable battery; and

To provide new and useful apparatus and method for charging a battery in which the condition of the battery being charged is periodically sensed.

DESCRIPTION OF THE PREFERRED EMBODIMENT

Figure 1:
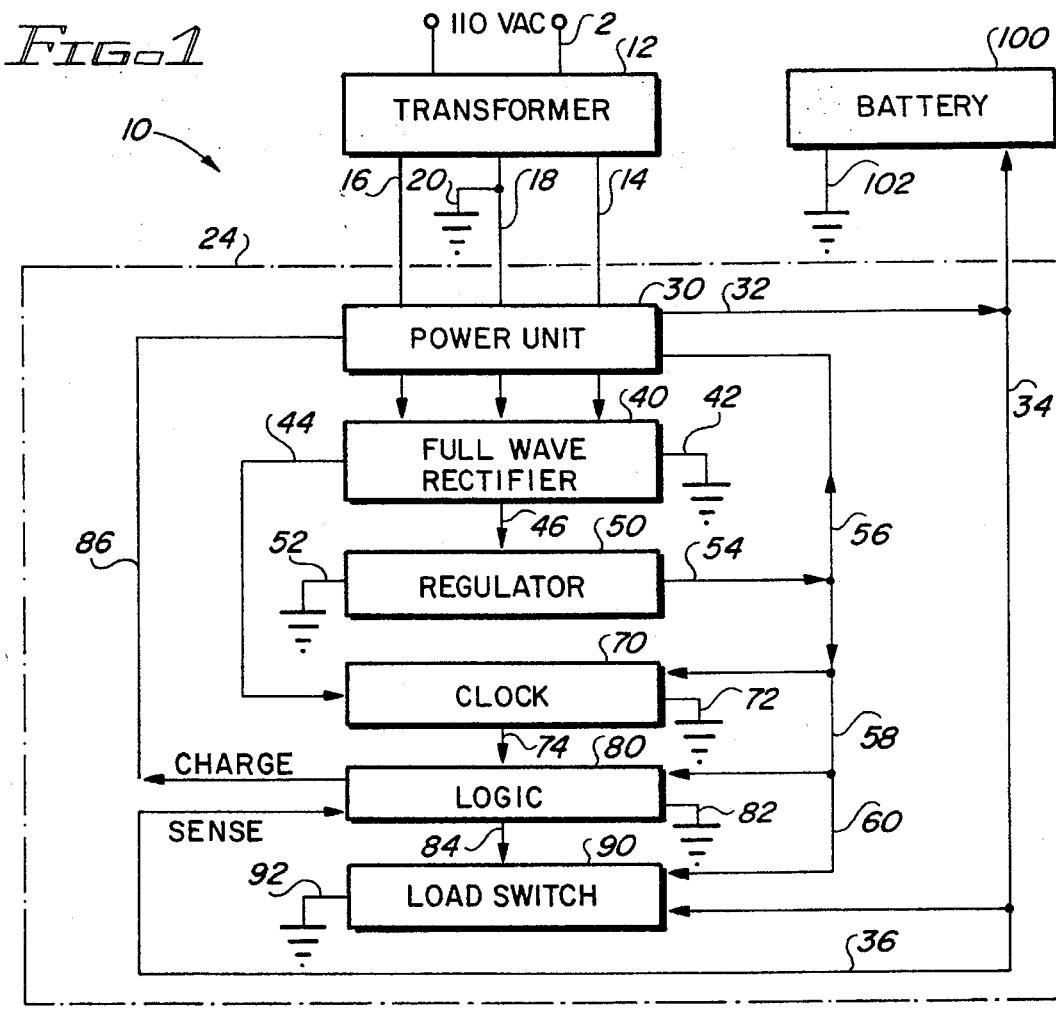
FIG. 1 comprises a schematic block diagram of the apparatus of the present invention.

FIG. 1 is a schematic block diagram of battery charging apparatus 10 of the present invention. The apparatus 10 includes a transformer 12 which may be appropriately connected to an alternating current (ac) line 2. The output of the transformer 12 extends on three conductors 14, 16, and 18, the latter of which is a ground conductor, through a power unit 30 to a full wave rectifier 40 within a charging housing 24. The power unit 30 is grounded through the conductor 18 from the transformer 12.

The power unit 30 is connected to a lead acid battery 100 by a conductor 32. The battery 100 is the battery being charged by the battery charging apparatus 10. The battery 100 is connected to the circuit ground by a conductor 102.

Other elements, except for the transformer 12, may also be disposed within the housing 20.

The rectifier 40 is connected to the circuit ground through a conductor 42. The rectifier 40 is connected by a conductor 44 to a clock 70 and by a conductor 46 to a regulator 50.

The purpose of the regulator 50 is to provide a regulated voltage supply for other elements of the charger apparatus, including the power unit 30, the clock 70, a logic unit 80, and a load switch 90.

The regulator 50 is connected to circuit ground by a conductor 52. A conductor 54 extends from the regulator 50 to the power unit 30. A conductor 56 extends from conductor 54 to the clock 70. A conductor 58 extends from the conductor 56 to the logic unit 80. A conductor 60 extends from the conductor 58 to the load switch 90. By means of the conductors 54 . . . 60, the regulator 50 is appropriately connected to the power unit 30, the clock 70, the logic unit 80, and the load switch 90.

The clock 70 is connected to the circuit ground through a conductor 72. The clock 70 is also connected to the logic unit 80 by a conductor 74.

The logic unit 80 is connected to the circuit ground through a conductor 82. The logic 80 is also connected to the load switch 90 by a conductor 84. A conductor 86 extends from the logic 80 to the power unit 30. An appropriate control signal from the logic unit 80 on conductor 86 enables the power unit 30 to provide a charging pulse on the conductor 32 to the battery 100.

From the conductor 32, a conductor 34 extends to the load switch 90. The purpose of the conductor 34 is to allow the load switch 90 to discharge the battery 100 after a charging pulse on the conductor 32. This will be discussed in more detail below.

A conductor 36 extends from the conductor 34 to the logic unit 80. The purpose of the conductor 36 is to allow the logic unit 80 to sense the condition of the battery 100 after a discharge pulse from the load switch 90 has been applied to the battery 100.

Charging current for charging the battery 100 is from the power unit 30. The charging current through the power unit 30 is controlled by the logic 80 in accordance with predetermined parameters and in accordance with timing information from the clock 70. Upon the expiration of a predetermined timing period, the charging current from the power unit 30 on conductor 32 stops, and a discharge time period is actuated through the load switch 90. The load switch 90 is connected to the conductor 32 through the conductor 34, as discussed above, and to circuit ground through a conductor 92.

The load switch 90 is controlled by the logic 80 through the conductor 84.

Typically, the ratio of the charge time to the discharge time is about twenty to one. That is, the power unit 30 charges the battery 100 for a predetermined time period which is about twenty times the length of the period that the load switch 90 is actuated to discharge the battery 100. Or, phrased in the opposite manner, the discharge time period is about one twentieth the length of the charge time period.

Following the discharge time period, the logic 80 samples and senses the voltage across the battery being charged through the conductor 36 which is in turn connected to the conductors 34 and 32. Since the logic 80 knows the desired voltage of the battery 100, the sensed or sampled voltage is an indication of the charge state of the battery 100. This will be discussed in detail below.

A full charge is placed on the battery 100 by the power unit 30 for the predetermined time period as determined by the logic 80. At the expiration of the predetermined time period, the load switch 90 is actuated to discharge the battery 100 for a relatively short time.

Following the discharge period, the voltage across the battery 100 is sensed to compare the sampled battery voltage with the desired battery voltage by the logic 80. When the desired battery voltage is sensed, the battery is fully charged, and no more charging is necessary.

Figure 2:
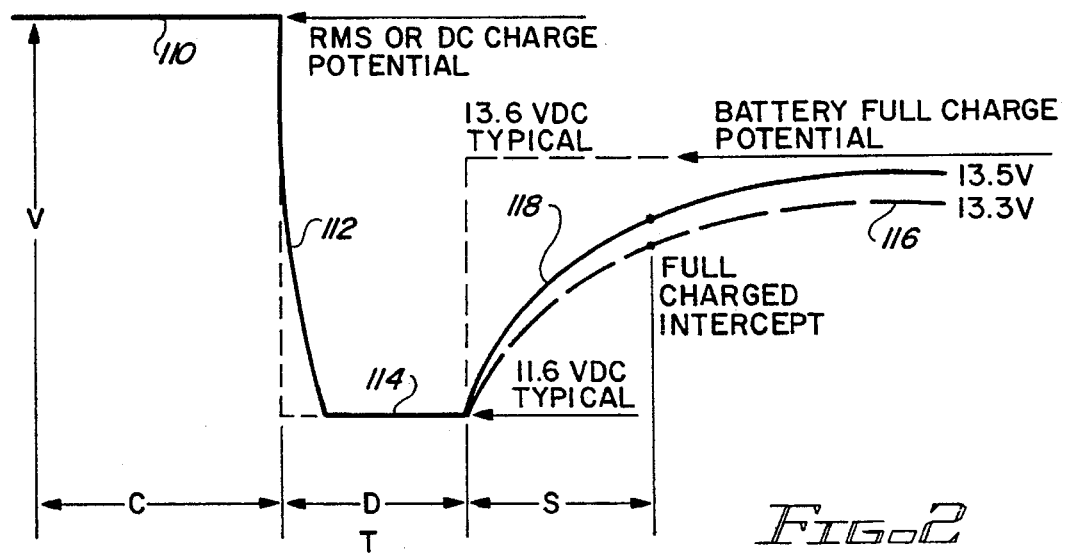
FIG. 2 is a schematic diagram illustrating the method included in the present invention.

FIG. 2 is a schematic diagram illustrating the method and apparatus of the present invention in charging a lead acid battery. In FIG. 2, voltage is on the vertical or y axis, and time is on the horizontal or x axis. For illustrative purposes, the lead acid battery 100 will be a twelve volt battery.

During a time period C, which is the charge time, a voltage of about 17 volts RMS (root mean square) full wave rectified voltage 110 or from a 17 volt dc source (not shown), is applied to the battery. The C or charge time period will vary, depending on the ampere-hour capacity of the battery. The charging current also varies, depending on the ampere-hour capacity of the battery. For example, with a battery having as low an ampere-hour capacity as nine, the charge rate would typically be about eight amps for a period of about three hundred milliseconds. For a much larger battery, such as a seventy ampere-hour battery, the charge period will be about one-half second (0.5 seconds) at sixty amps and using perhaps nineteen volts RMS full wave rectified or from a dc source, as indicated above.

Following the charge pulse, there is a discharge time period D. The D or discharge time period is also adjustable, depending on the particular battery. There are three elements to be considered in the discharge time, the battery internal resistance, the intrinsic capacitance of the battery plates, and the required load to shock the battery (electrolyte shock).

It will be noted that the voltage decays exponentially from the charge voltage, which is 17 volts RMS, as indicated above, to a minimum of about 11.6 volts. The voltage decay curve is noted by reference number 112. The 11.6 volts holds steady for the rest of the discharge period, noted by reference number 114.

Following the discharge period, there is a sample period or S period. The sample period is rather difficult to estimate, due to battery construction and electrolyte.

Since the recovery potential of a battery is an exponential function, the sample period may be computed by measuring the discharge potential at the conclusion of the discharge period and then measuring the potential at a known or predetermined period of time following the removal of the discharge function. This allows the asymptotic value that the exponential function will reach to be calculated from the sampled voltages.

The asymptote is a direct indicator of the charge level of a lead acid battery, and the asymptote can accordingly be used to determine whether an additional charge period is required or not. If the asymptote is less than the fully charged potential, indicated by reference number 116, a second charge period will be required, and the total sequence will be repeated. The asymptotic value of line 116 is about 13.3 volts, which is less than the fully charged asymptotic value.

If the asymptote is equal to or greater than the fully charged potential of the battery, then there will not be a need for a charge period following the sample period. In the latter case, the discharge sequence will continue repeatedly, at specified time intervals, until such time that the asymptote falls below the fully charged potential level, which is typically about 13.6 volts for a twelve volt battery. This is shown by the line identified by reference numeral 120. The fully charged asymptotic value of about 13.5 volts is indicated by the reference numeral 118.

At such time as the asymptote falls below the fully charged potential level, a further charge time period will be prescribed, and the sequence continues. This, of course, substantially eliminates the possibility of a battery overcharge.

The charge time for a lead acid battery is the function of the ampere-hours divided by the charging current. In the example given above, a twelve volt lead acid battery having a nine ampere-hour capacity, and a charge rate of eight amps, will be fully charged in slightly over one hour. Similarly, a battery having an ampere-hour capacity of seventy, and charging amperage of about sixty, will likewise take slightly over an hour to be fully charged.

The pulse charge method and apparatus of the present invention greatly reduces the crystalline buildup on the battery plates by providing a discharge cycle. Moreover, thermal heating of the battery being charged is reduced substantially because of the reduced crystal buildup and also by the fact that removing the crystals actually removes heat from the charging operation as the battery cools after charging. Finally, mechanical stress from the battery plates is reduced substantially over the conventional, linear charging methods of the prior art.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claim is:

1. A method for pulse charging a lead acid battery comprising in combination the steps of:
   1) providing dc voltage for charging the battery;
   2) pulsing the dc voltage for a predetermined period of time to charge the battery;
   3) discharging the battery after a charging pulse;
   4) sensing the voltage across the battery after discharging the battery by taking two samples of the battery voltage after discharging the battery;
   5) comparing the sensed voltage to a predetermined value to determine the charge state of the battery; and
   6) repeating steps 1 through 5 until the sensed voltage indicates that the desired charge state of the battery has been reached.

2. The method of claim 1 in which the step of providing dc voltage includes the step of providing rectified dc voltage.

3. The method of claim 2 in which the step of providing rectified dc voltage includes the step of providing full wave rectified dc voltage.

4. The method of claim 1 in which the step of discharging the battery includes the step of placing a load across the battery for a predetermined discharge time period.

5. The method of claim 4 in which the step of sensing the voltage across the battery includes the steps of taking a first sample of the battery voltage immediately after the predetermined discharge time period and taking a second sample of the battery voltage at another predetermined time after taking the first sample.

6. The method of claim 5 in which the step of comparing the sensed voltage to a predetermined value includes the step of calculating an asymptotic value from the sensed voltage.

7. The method of claim 1 in which the step of discharging the battery includes the step of discharging the battery for a predetermined time period.

8. The method of claim 7 in which the step of discharging the battery for a predetermined time period includes the step of calculating the predetermined time period by considering battery internal resistance, intrinsic capacitance of battery plates, and load required for electrolyte shock.

9. The method of claim 6 in which the step of comparing the sensed voltage to a predetermined value further includes the step of comparing the calculated asymptotic value to a known asymptotic value for a fully charged battery.

10. The method of claim 9 which further includes the steps of discharging the battery after the asymptotic value of a fully charged battery has been sensed, and sensing the battery voltage after discharging the battery, calculating again the asymptotic value from the sensed voltage, comparing the asymptotic voltage to the known asymptotic value of a fully charged battery, and repeating these steps until the calculated asymptotic value decreases below the known asymptotic value for a fully charged battery.

11. The method of claim 10 which further includes the step of again providing a charging pulse for the battery to return the battery to its fully charged state.

12. The method of claim 1 which further includes the step of providing a clock for timing the charging, discharging, and sensing steps.

13. A method for pulse charging a lead acid battery comprising in combination the steps of:
   1) providing rectified dc voltage for charging the battery;
   2) pulsing the rectified dc voltage for a predetermined period of time to charge the battery;
   3) discharging the battery after a charging pulse;
   4) sensing the voltage of the battery after discharging the battery by sampling the battery voltage a plurality of times after discharging the battery;
   5) comparing the sensed voltage to a predetermined value to determine the charge state of the battery; and
   6) repeating steps 1 through 5 until the sensed voltage indicates that the desired charge state of the battery has been reached.

14. The apparatus of claim 13 in which the step of sensing the voltage of the battery includes the step of sensing the battery voltage twice after discharging the battery.

15. The apparatus of claim 14 in which the step of sensing the voltage of the battery includes the step of waiting a predetermined time between the first and second sensings of the battery voltage.

* * * * *